J. HUGHES, DEC'D.
E. W. HUGHES, ADMINISTRATRIX.
ELECTRODE HOLDER.
APPLICATION FILED MAR. 24, 1919.
1,335,895.
Patented Apr. 6, 1920.
3 SHEETS—SHEET 1.
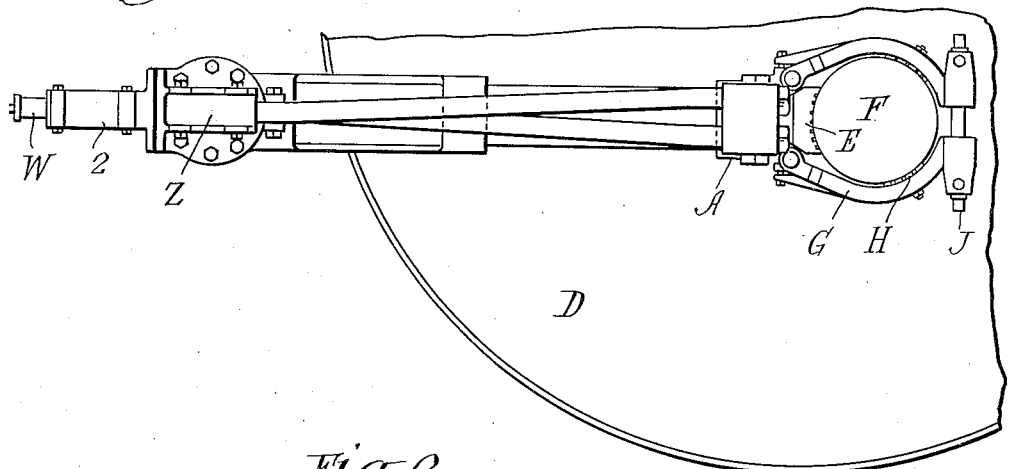
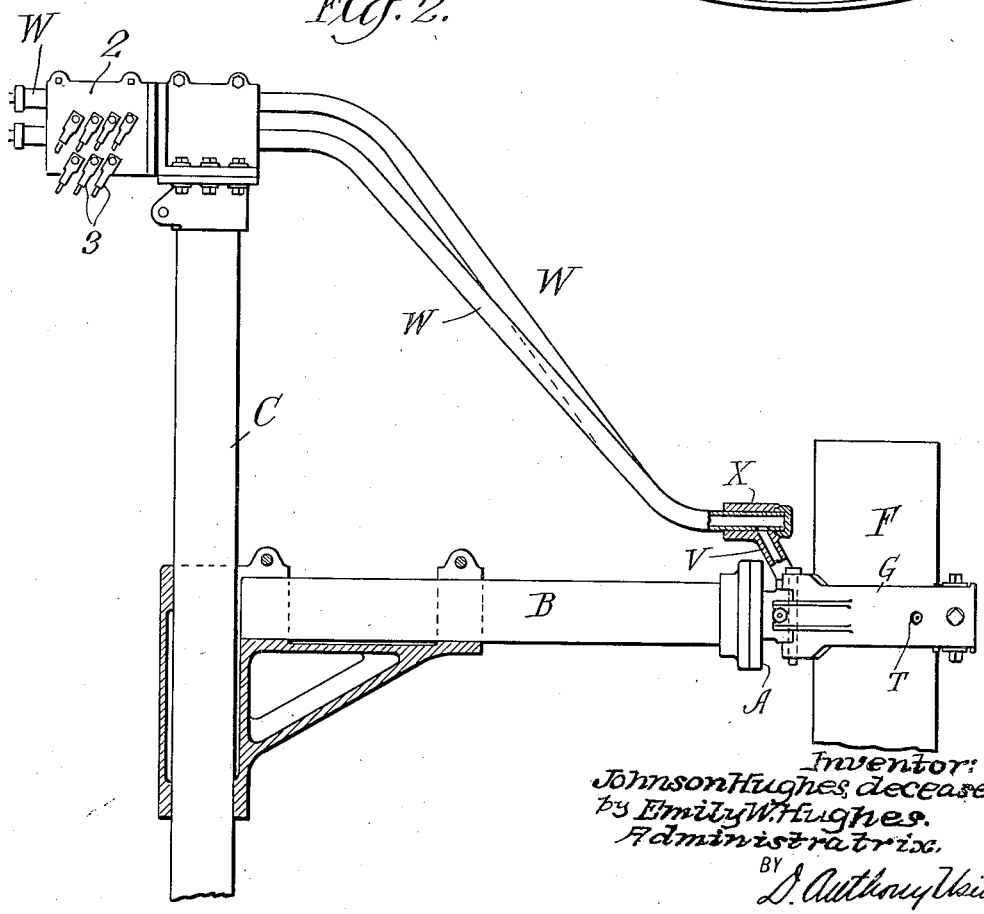
Inventor:
Johnson Hughes, deceased
by Emily W. Hughes
Administratrix.
BY D. Anthony Usina
ATTORNEY

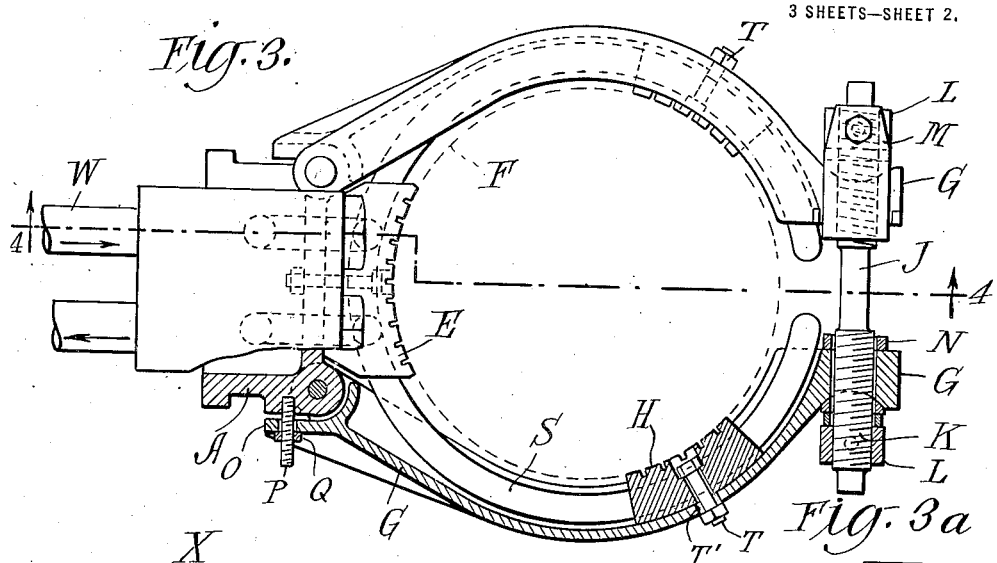
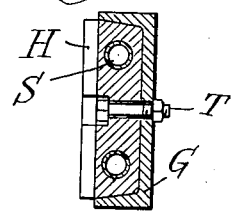
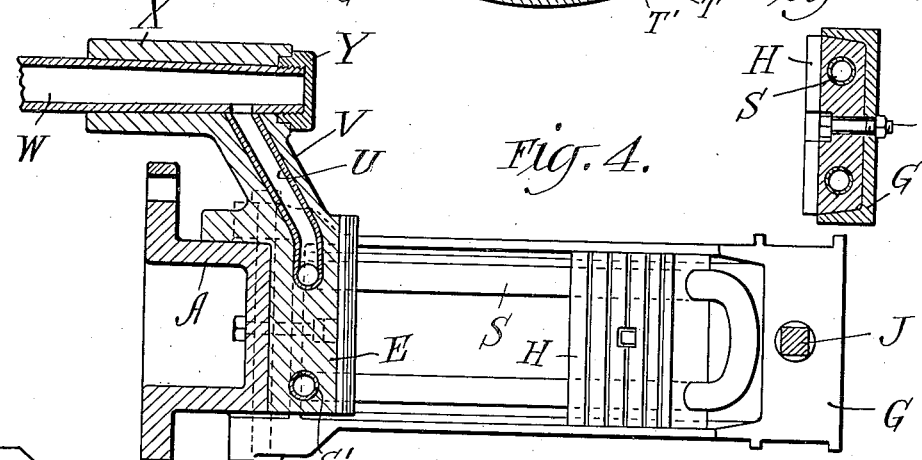
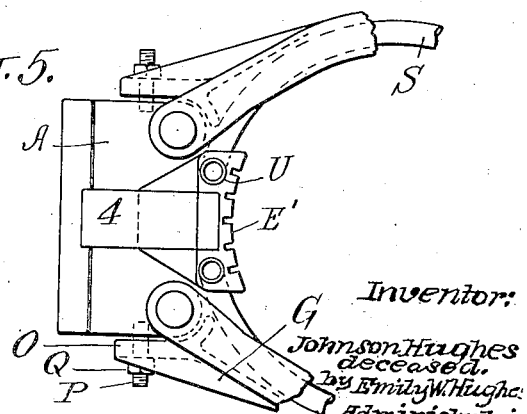
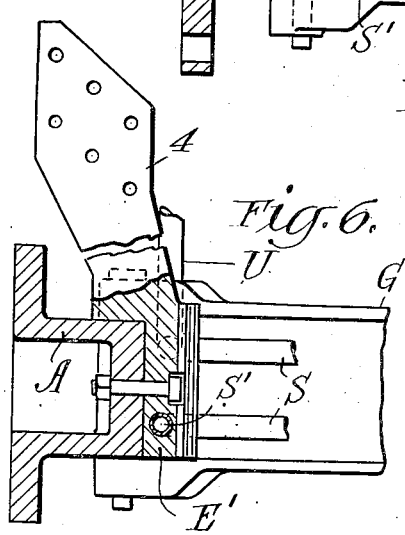

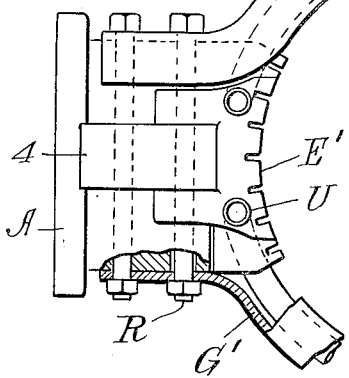
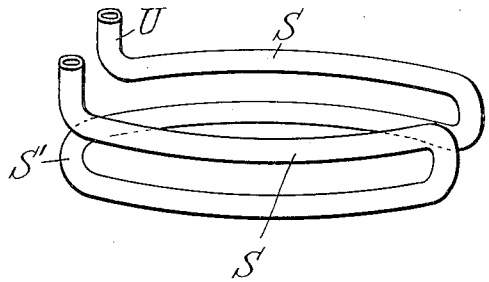
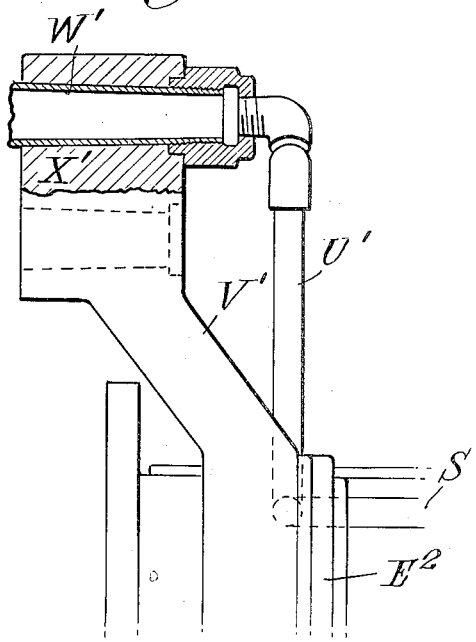
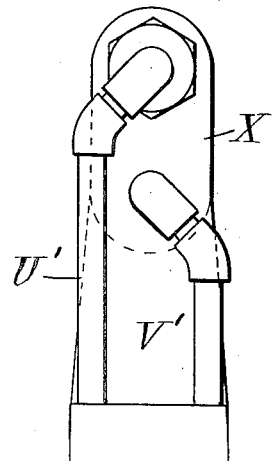

UNITED STATES PATENT OFFICE.

JOHNSON HUGHES, DECEASED, LATE OF PHILADELPHIA, PENNSYLVANIA, BY EMILY W. HUGHES, ADMINISTRATRIX, OF PHILADELPHIA, PENNSYLVANIA.

ELECTRODE-HOLDER.

1,335,895.  Specification of Letters Patent.  Patented Apr. 6, 1920.

Application filed March 24, 1919. Serial No. 284,695.

*To all whom it may concern:*

Be it known that JOHNSON HUGHES, deceased, late a citizen of the United States, residing at Philadelphia, in the county of Philadelphia and State of Pennsylvania, (EMILY W. HUGHES, of Philadelphia, Philadelphia county, State of Pennsylvania, administratrix of the estate of Johnson Hughes deceased,) did invent certain new and useful Improvements in Electrode-Holders, of which the following is a specification.

This invention aims to provide a holder adapted especially for large electrodes such as are used in the Heroult and similar electric furnaces.

Holders heretofore used for such electrodes have been imperfect in several respects. They have generally been ill adapted to the variations from standard size which characterize commercial electrodes. The holder of this present invention is less rigid than the older types, can be more exactly fitted to an electrode which is over or under the standard size, and is provided with an improved cooling arrangement, and these features contribute greatly to its durability. The conductor which carries the current from its source to the holder may also carry the cooling water to the holder proper and by this arrangement be kept so cool that it can be made lighter than heretofore. This lightness not only saves copper but has advantages in lessening the weight carried by the furnace.

The accompanying drawings illustrate embodiments of the invention.

Figure 1 is a plan of one of the electrode holders and its connections to the source of current;

Fig. 2 is a side elevation of the same;

Fig. 3 is a plan partly in section, of the holder of Fig. 1, on an enlarged scale;

Fig. 3ª is a vertical section through one of the contacts;

Fig. 4 is a section of the same on the line 4—4 of Fig. 3;

Figs. 5 and 6 are respectively a plan and vertical section of a part of a holder of slightly different design;

Fig. 7 is a plan of a part of a holder of a third design;

Figs. 8 and 9 are respectively a vertical longitudinal section and an end elevation of certain connections for a water cooling system of the holders of Figs. 5, 6 and 7;

Fig. 10 is a perspective view of the water pipes in the holder.

Referring to the embodiments of the invention illustrated the holder comprises a bracket or supporting member A which is mounted upon any suitable frame work such for example as the arm B, Fig. 2, of a bracket on a post C arranged at the rear of the furnace; a segment of the latter being indicated in plan at D, Fig. 1. On the supporting member A there is carried a contact E adapted to engage the electrode F. Arms G are carried by said supporting member A, each of these carrying a separate contact H, so that the three contacts will embrace and hold the electrode. The arms G are arranged to swing inward or outward so as to grip the electrode firmly within the contacts, the outer ends of these arms being held together by a bolt J.

The bolt J is provided at opposite ends with right and left hand threads K respectively (Fig. 3) which are threaded through nuts L pivotally fastened in wings M of a stirrup N which embraces the end of the arm G, suitable washers being interposed between the arm G and the nut L to ease the slight rocking movement which takes place. Thus we avoid any bending strain on the bolt and thus through the nuts and stirrups N force the ends of the arms positively outward or inward.

The movements of the arms are limited. In Figs. 3 and 5 the arms G are of cast iron or steel hinged to the supporting member A and have tails O with openings which pass freely over bolts P screwed into the supporting member and provided with nuts Q which limit their closing movement, while the sides of the supporting member limit the opening movement of the arms. In Fig. 7 the arms G' are fastened to the supporting member by means of bolts R but are made of metal having sufficient spring to allow a slight outward and inward movement of the arms.

The pipes, preferably of copper, which carry the cooling water or other fluid are fastened at their ends to the supporting member or contact E carried thereby and are provided with branches S extending from the contact member E in the form of loops as shown best in Fig. 10. The upper branch of each loop passes through the upper portion of a contact H and beyond this is bent down and returned through the lower portion of the same contact. Thus the cooling pipes are not rigidly mounted in the arms and do not interfere with the desired flexibility thereof. The contacts H are mounted as shown in Fig. 3ᵃ within the flanged inner face of the arms G by means of bolts T passing through slightly elongated slots T' (Fig. 3) in the arms G. The loops S pass through the contacts above and below the fastening bolts. The contact E is similarly fastened to the supporting member A.

The lower branches of the two loops S meet in a single pipe S' extending continuously through the lower part of the contact E. The upper branches of these loops pass into the opposite ends of the contact and thence upward through branches U (Fig. 4) through an extension V of the contact where these pipes communicate with similar copper pipes W. The extension V is provided with a head X having tapered openings therein into which the tapered ends of the pipes W are forced and fastened by heads Y threaded onto the ends of the pipes and bearing against the head X of the extension. The water enters through one of the pipes W as indicated in Fig. 3 and circulates through the two looped branches and the three contacts and then passes out through the other pipe W. The pipes W extend from the contact to and through a block Z, Fig. 1, which is rigidly mounted on the top of the post C and thence through a terminal 2 which is connected to the several cables 3 from the transformer or other instrument, so that the block 2 forms for this electrode the source of current. The pipes W are shown extended beyond this terminal to any suitable source of supply and place of discharge for the water.

While the use of pipes W for conveying the current from the terminal 2 to the electrode holder has certain advantages as stated above, yet these pipes W may be dispensed with and the current may be carried through bus-bars or ordinary cables or other means. In this case the supporting member A of the holder will carry the contact E' (Figs. 5, 6 and 7) from which the pipes U will go directly to the place of supply and discharge of water. For securing the electrical connection the contact will be provided with an upwardly extending block or plate 4 to which the usual cables may be directly attached.

Another design for the fixed contact member is shown in Figs. 8 and 9. Here the contact member E² carries an upward extension V' and a head X' similar to those of Fig. 4. But the ends of the upper loops S after passing through the contact pass upward out of the same as shown at U' and are connected to the exposed ends of pipes W' which are fastened in the head X' in a manner similar to that shown in Fig. 4.

By reason of the hinges or light springs connecting the arms to the supporting member, the arms may be easily opened. The limitation on the outward movement of the arms prevents such a swinging of the two arms together so far to the right or to the left as would carry the electrode out of proper alinement. In the style of electrode most generally used heretofore the embracing arms have been connected together at their rear ends with a fairly rigid connection to prevent such improper alinement of the electrode, and at the same time this has made it necessary to apply considerable force to the opening of the arms and has made it difficult to fit them to electrodes varying materially from the cross-section for which they were designed, such variations being frequent in commercial practice.

The electrodes are firmly engaged by the contact pieces of my improved holder. The arms serve only to hold the contact pieces in or out of engagement with the electrode. Consequently the arms need not be of conductive material but may be made of stronger material such as steel, iron or bronze while the contacts and cooling pipes are of copper. The slots T' in the arms, through which pass the bolts T carrying the contacts, permit of a slight play which enables the contacts to conform easily to variations in the electrodes.

Although there has been described with great particularity of detail certain specific embodiments of this invention yet it is not to be understood therefrom that the invention is restricted to the embodiments disclosed. Various modifications thereof in detail and in the arrangement of the parts may be made by those skilled in the art and various features of improvement may be used separately without departure from the invention as defined in the following claims.

What is claimed is—

1. The combination with an electrode holder of a water cooled conductor conveying the current from a suitable source to said holder.

2. The combination with an electrode holder of pipes of conducting material conveying the current from a suitable source to said holder, said pipes arranged for circulation of a cooling medium through them.

3. An electrode holder having passages adapted for circulation of a cooling medium in combination with pipes of conducting material conveying the current from a suitable source to said holder and communicating with said passages in the holder.

4. An electrode holder having separate contacts adapted to be adjusted to fit the electrode, said contacts being connected to one another through electric conductors having passages for circulation of a cooling medium.

5. An electrode holder comprising a supporting member carrying a contact and a pipe of conducting material connected thereto and comprising other contacts and pipes of conducting material communicating with the first pipe so as to permit circulation of a cooling medium through the several conducting pipes.

6. An electrode holder comprising a supporting member carrying a contact and comprising other contacts electrically connected to the first and adjustable to fit the electrode in combination with arms carried by said supporting member and embracing said other contacts, the free ends of said arms being movable to effect such adjustment.

7. An electrode holder including in combination a supporting member carrying a contact, and arms carried by said member and carrying separate contacts.

8. An electrode holder including in combination a supporting member, arms pivoted thereon and stops for limiting the opening movement of said arms.

9. An electrode holder including in combination a portion having a tapered opening therein and a pipe of conducting material forced into said opening to make a good contact therewith and arranged to convey a cooling medium to the holder.

10. An electrode holder comprising embracing arms, contacts carried thereby and cooling pipes of conducting material separate from said arms and engaging said contacts to cool and electrically connect them with each other.

11. An electrode holder comprising a supporting member, embracing arms secured to said supporting member, and contacts mounted on said arms, said arms being adjustable to hold said contacts in or out of engagement with the electrode.

12. An electrode holder comprising a supporting member, adjustable embracing arms secured to said supporting member, and contacts mounted on said arms, means mounted on the free ends thereof for adjusting the arms to hold said contacts in or out of engagement with the electrode, and means for electrically connecting said electrodes together.

In witness whereof, I have hereunto signed my name.

EMILY W. HUGHES,

*Administratrix of the Estate of Johnson Hughes, deceased.*